Inventors
Eugene Porter Worthen
and Fenner Smith Barbour.

By R. S. A. Dougherty.
Attorney

Oct. 7, 1952 — E. P. WORTHEN ET AL — 2,613,177
LOW-PRESSURE FLASH EVAPORATOR
Filed July 1, 1948 — 10 Sheets-Sheet 3

Inventors
Eugene Porter Worthen
and Fenner Smith Barbour.
By R. S. A. Dougherty,
Attorney Oct. 7, 1952 — E. P. WORTHEN ET AL — 2,613,177
LOW-PRESSURE FLASH EVAPORATOR
Filed July 1, 1948 — 10 Sheets-Sheet 7

Inventors
Eugene Porter Worthen
and Fenner Smith Barbour;
By R. S. C. Dougherty,
Attorney Oct. 7, 1952 E. P. WORTHEN ET AL 2,613,177
LOW-PRESSURE FLASH EVAPORATOR
Filed July 1, 1948 10 Sheets-Sheet 8

Inventors
Eugene Porter Worthen
and Fenner Smith Barbour
By R. S. C. Dougherty,
Attorney Oct. 7, 1952 — E. P. WORTHEN ET AL — 2,613,177
LOW-PRESSURE FLASH EVAPORATOR
Filed July 1, 1948 — 10 Sheets-Sheet 10

Fig. 10.

Inventors
Eugene Porter Worthen
and Fehner Smith Barbour:

By R. S. C. Dougherty.
Attorney

Patented Oct. 7, 1952

2,613,177

UNITED STATES PATENT OFFICE 2,613,177

LOW-PRESSURE FLASH EVAPORATOR

Eugene Porter Worthen, Braintree, and Fenner Smith Barbour, Wollaston, Mass., assignors to Bethlehem Steel Company, a corporation of Pennsylvania Application July 1, 1948, Serial No. 36,306

11 Claims. (Cl. 202—174)

This invention relates in general to an improved apparatus for distilling water, and more particularly to an evaporating apparatus adapted for marine use to transform sea water into fresh water as required for boiler feed and drinking purposes.

The usual type of marine evaporator relies for the production of vapor upon the boiling of sea water in contact with hot metal surfaces. One result of this boiling in the formation of scale on the evaporator tubes, which causes a loss in efficiency and requires periodic removal. However, when salt water is heated at a pressure sufficiently high to prevent boiling, in the range of temperatures involved in this invention, there is practically no precipitation of the salts out of the water and hence no formation of scale. In the present invention, therefore, the vapor is formed by flashing from the hot sea water, which is maintained at a pressure somewhat above that corresponding to the flash temperature.

An additional source of scale formation and corrosion in some types of evaporators is the concentration of salts produced through recirculating the heated brine. We have eliminated in this evaporator any necessity of such recirculation by operating at low brine and vapor temperatures in two stages or effects, with regenerative feed heating and very efficient separation of vapors.

Handling during installation is simplified and there are made possible large savings in weight, space, piping, and lost heat, all of which must be economized as much as possible on shipboard, through disposing all the units of the evaporator either within or upon the single container shell.

One object of this invention, therefore, is to provide a low pressure two stage flash evaporator which operates at low brine and vapor temperatures without recirculation of the brine, thereby limiting concentration of salts and reducing formation of scale.

Another object is to provide a marine flash evaporator using sea water feed and regenerative feed heating, thus eliminating the use of main station feed for condenser cooling water.

Another object is to provide means for removing the fine moisture droplets or fog from the flash vapor.

Still another object is to provide a highly compact, efficient and convenient operating assembly.

Other and further objects, purposes and advantages of this invention will be apparent from the following description, wherein reference is made to the annexed ten (10) sheets of drawings illustrating the preferred form of the invention and wherein like reference numerals designate like parts.

In the drawings:

Fig. 10 is a piping diagram of the apparatus.

Figure 1:
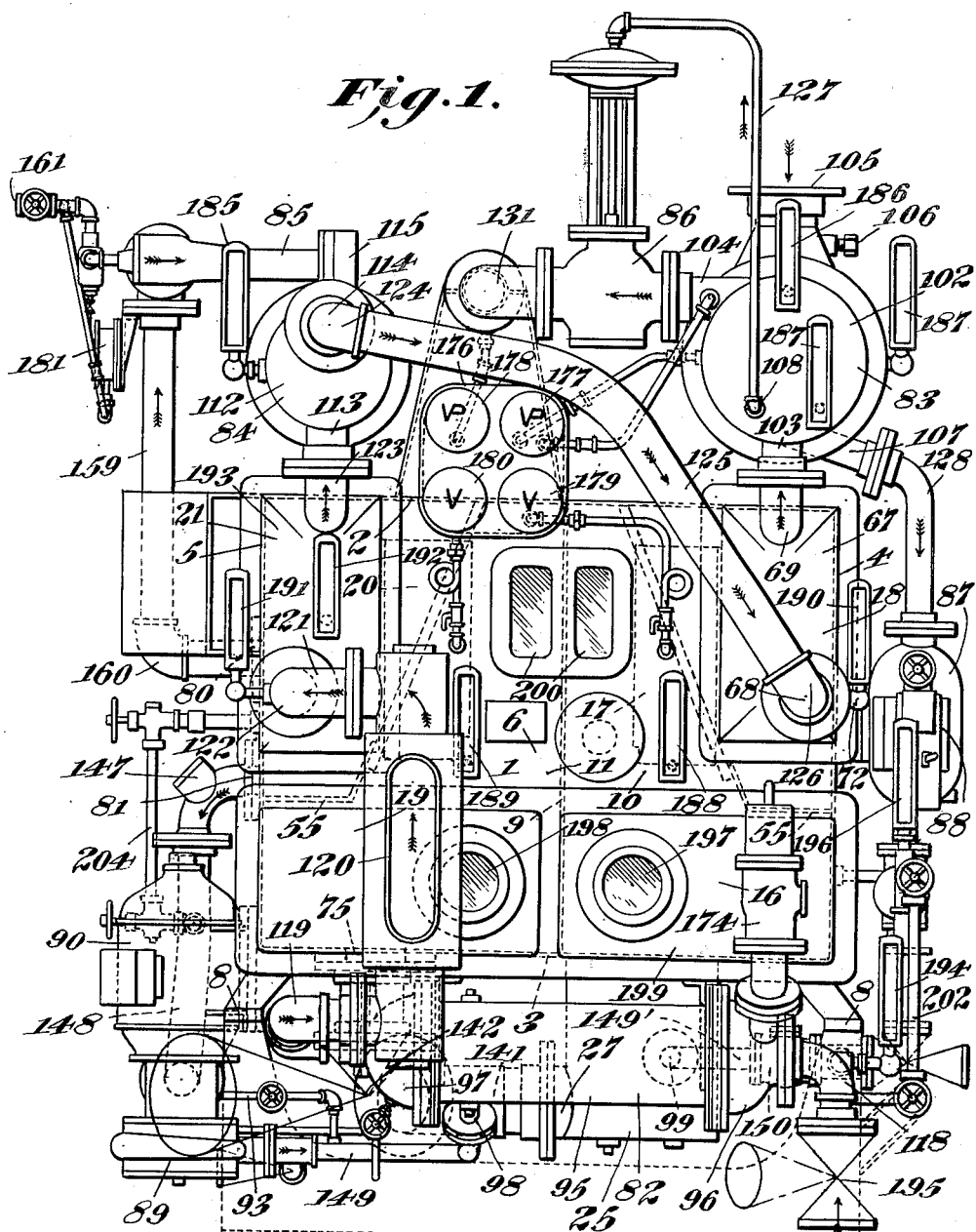
Figure 1 is a front elevation of the assembled apparatus, showing it on the operating end.

Referring initially to Figs. 6 to 9 inclusive of the drawings, the flash evaporator casing comprises a rectangular boxlike metal shell 1, consisting of a top plate 2 and bottom plate 3, joined by welded side plates 4 and 5 on the right and left sides respectively, with end plates 6 and 7 at front and rear respectively, and mounted on the foot plates 8, at the four bottom corners. The shell 1 is divided transversely from front to rear by the central vertical division plate 9 into a first stage compartment 10 and a second stage compartment 11 of substantially equal size. Additional rigidity is imparted to the shell 1 and division plate 9 by welded stiffeners 12 (top), 13 (side), and 14 (bottom) and bottom gusset plates 15.

Except for certain details to be hereinafter noted, the first and second stage compartments 10 and 11 are very similar, there being in the first stage compartment a bottom flash chamber 16 and above it and communicating therewith a vapor separator 17 and a condenser 18, and the second stage compartment also being provided with a flash chamber 19 and communicating vapor separator 20 and condenser 21.

The liberation of flash vapor caused by the sudden reductions in absolute pressure upon arrival in the flash chambers is so rapid that it usually carries with it particles of salt moisture which unless removed would contaminate the made water. We have found that a very efficient means of removing the finer moisture droplets or fog from the flash vapor is to introduce the feed to each flash chamber in such a way that the vapor is released under water and is required to mix thoroughly with the water by means of the submerged flash boxes 23 and 24. Large droplets of moisture that may be carried along with the rising vapor are removed subsequently by the vapor separators 17 and 20.

The first stage flash chamber 16 (see Figs. 6 and 7) is therefore provided with a rear inlet orifice 22 from which extends forwardly the longitudinal duct 28 of the flash box 23, said duct 28 connecting by orifices 29 to chamber 30 covered by three spaced horizontal plates 31 having a plurality of perforations 32 which are staggered with respect to each other in a vertical direction. The large cylindrical drain well or sump 25 extends downwardly from the bottom plate 3 of said first stage flash chamber 16, and is provided with a drain outlet 27. The flash box 24 in the second stage flash chamber 19 is similarly provided with an inlet duct 33, communicating through slots 34 with a chamber 35 also covered by spaced perforated plate 31.

The vapor separators 17 and 20 are preferably of the type disclosed and claimed in the patent to Worthen et al., No. 2,439,536, issued April 13, 1948, in which the separating action is accomplished through the tendency of the water particles to adhere to the surfaces of a plurality of narrow passages and liquid-intercepting pockets, with a bottom connection 36, drain pipe 37 and suspended water-sealing pot 38 for receiving the entrained salt moisture. Supporting diagonal side flanges 51 and top and bottom flanges 52 and 53 are secured to a blank-off plate 54, which in turn is secured to top plate 2 and end plates 6 and 7 of the shell and to bottom wrapper plate 55 of the adjoining condenser. Hand-hole plate 59 in cover plate 2 allows access for repairs or cleaning.

The first stage condenser 18 comprises the two lower tube passages 60 arranged in horizontal sequence and provided with baffle plate 61, and the four upper tube passes 62 arranged in vertical sequence. Said tubes 60 and 62 are mounted forwardly above the bottom wrapper plate 55 in the front tube sheet 63 secured to the front end plate 6, and are centrally supported by the perforated support plate 64, and rearwardly by the rear tube sheet 65 secured by the expansion joint 66 to the rear end plate 7. Said first stage condenser 18 is also provided with suitably subdivided front tube nest cover 67, having feed inlet 68 and outlet 69, and rear tube nest cover 70. Vents 71 on side plate 4 and thermometer connection 72 on feed inlet 68 are also provided, and the condenser 18 is drained through the rear orifice 73.

The second stage compartment 11, as previously mentioned, contains the lower flash chamber 19, vapor separator 20, and condenser 21, of similar construction to those in the first stage compartment 10.

Figure 8:
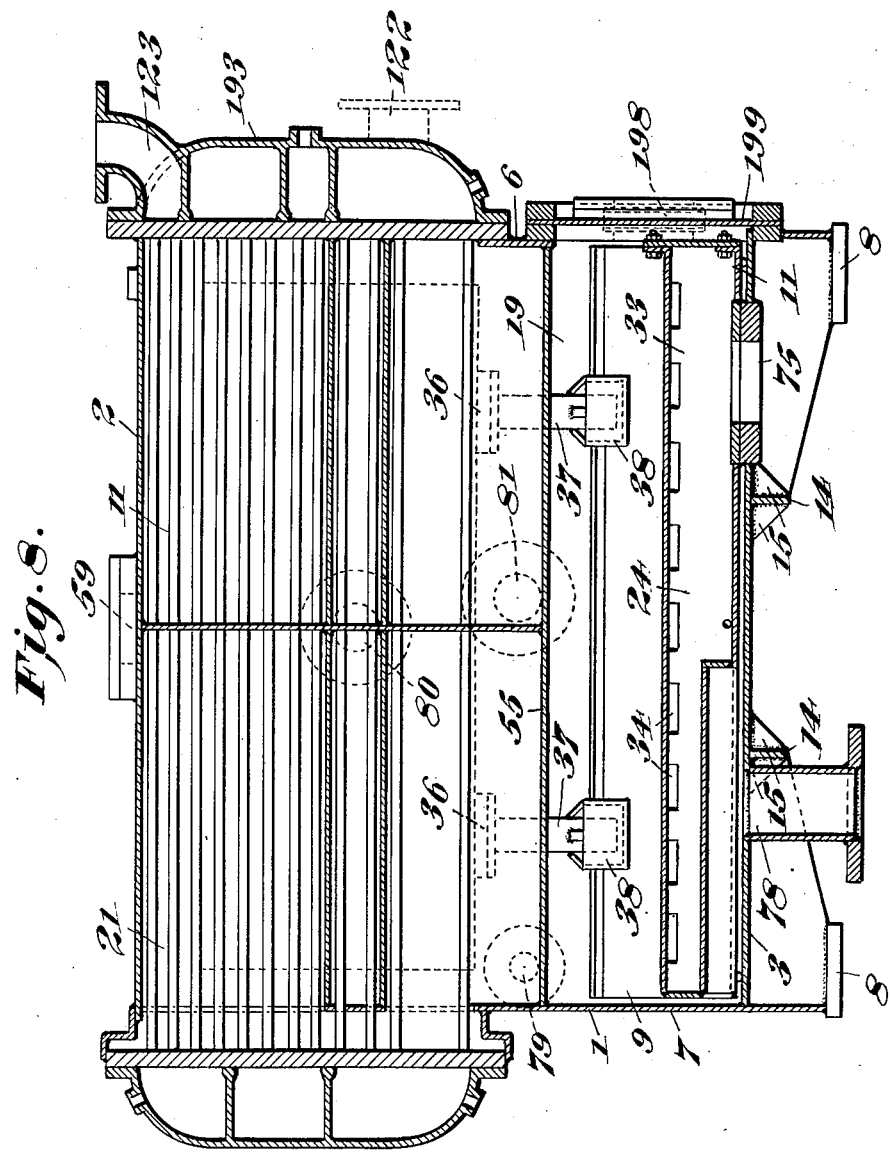
Fig. 8 is a vertical section on the line 8—8 of Fig. 6, taken through the second stage condenser.
Figure 9:
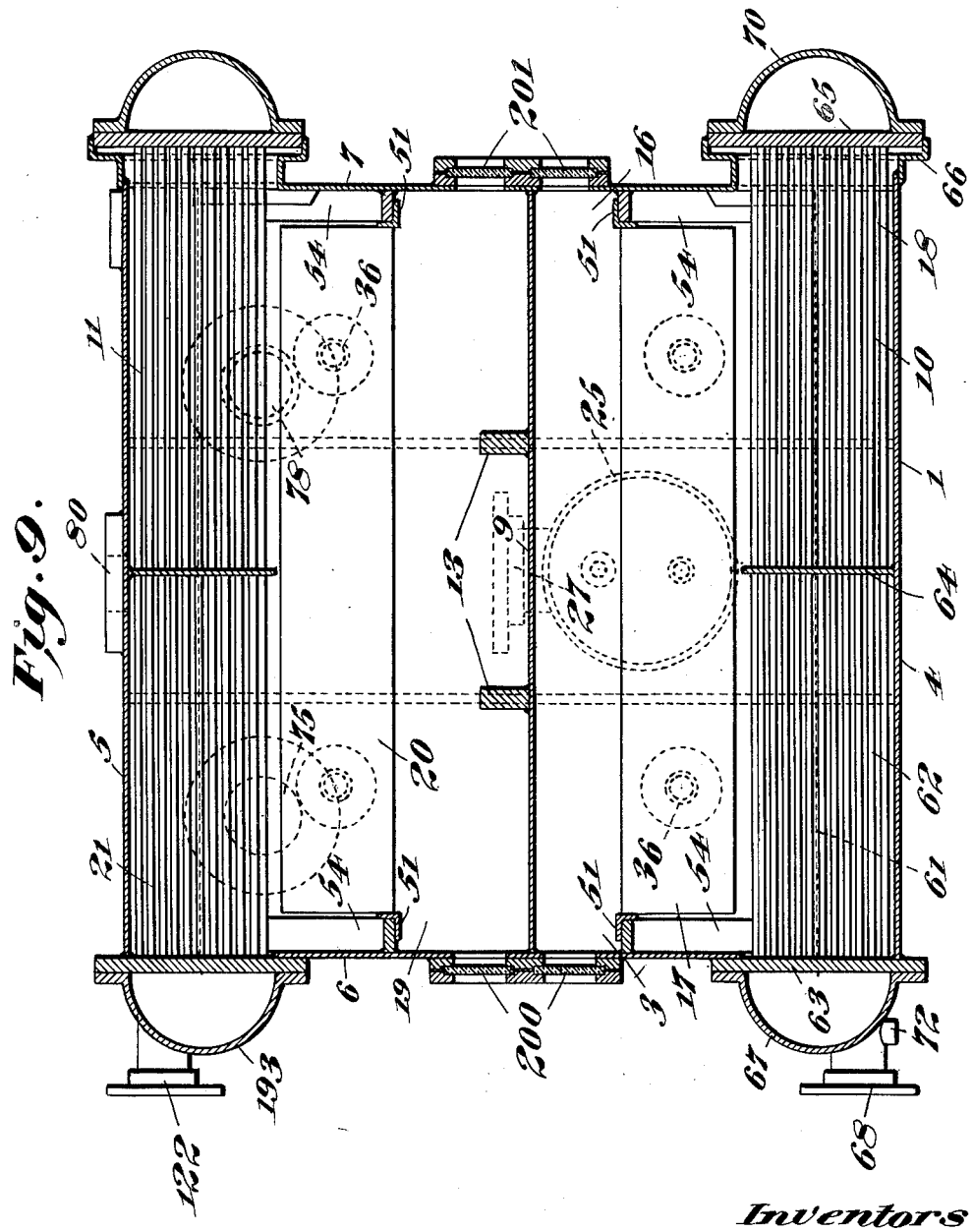
Fig. 9 is a horizontal section on the line 9—9 of Fig. 6.

However, as shown in Fig. 8, the second stage flash chamber 19 the inlet duct 33 of flash box 24 receives its feed through the bottom orifice 75, and the bottom outlet orifice 78 is provided for brine pump suction. The side wall 5 of the second stage condenser 21 is provided with the inlet orifice 79, air ejector orifice 80, and outlet orifice 81.

Figure 2:
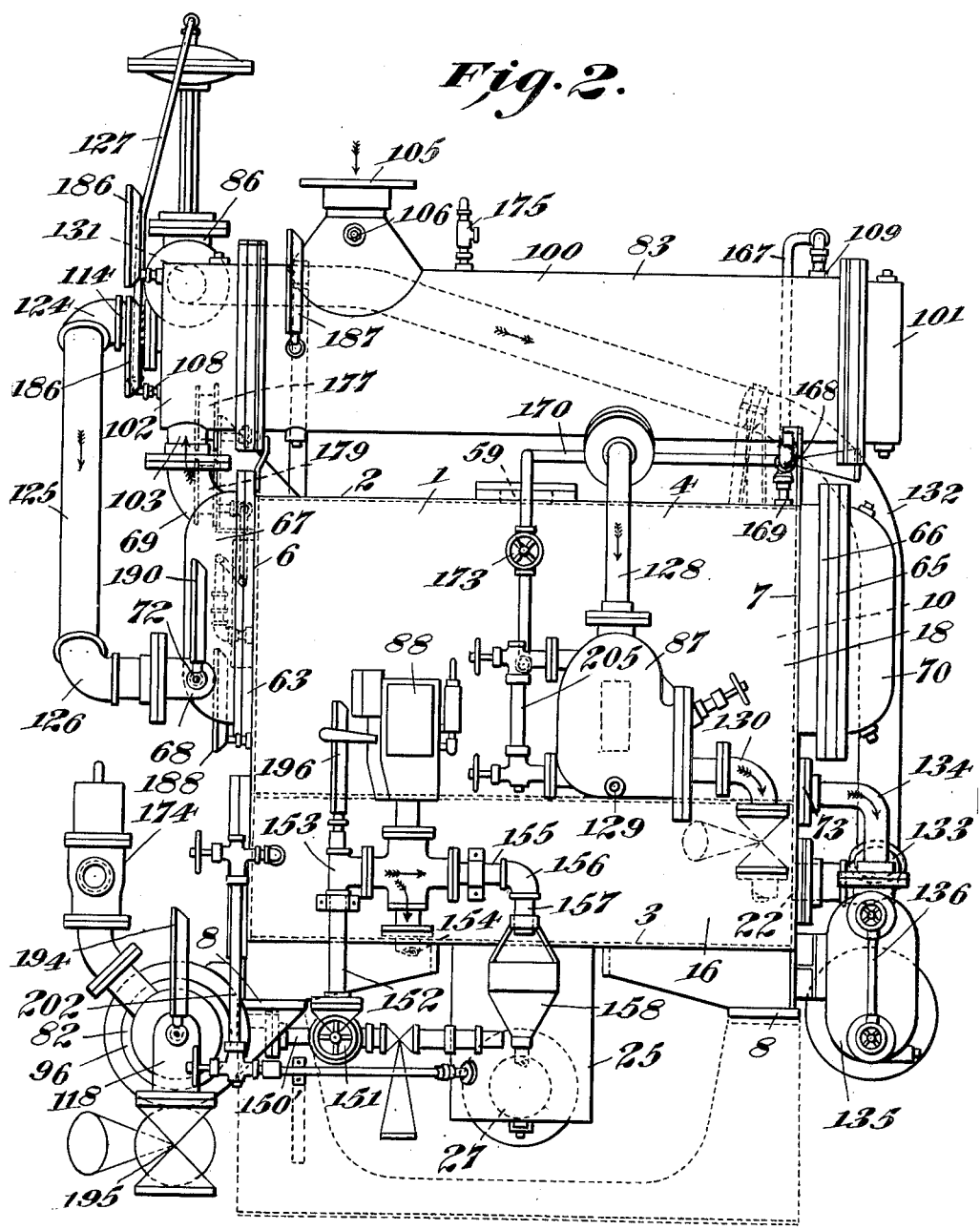
Fig. 2 is a side elevation of the apparatus, showing it on the first stage side.
Figure 3:
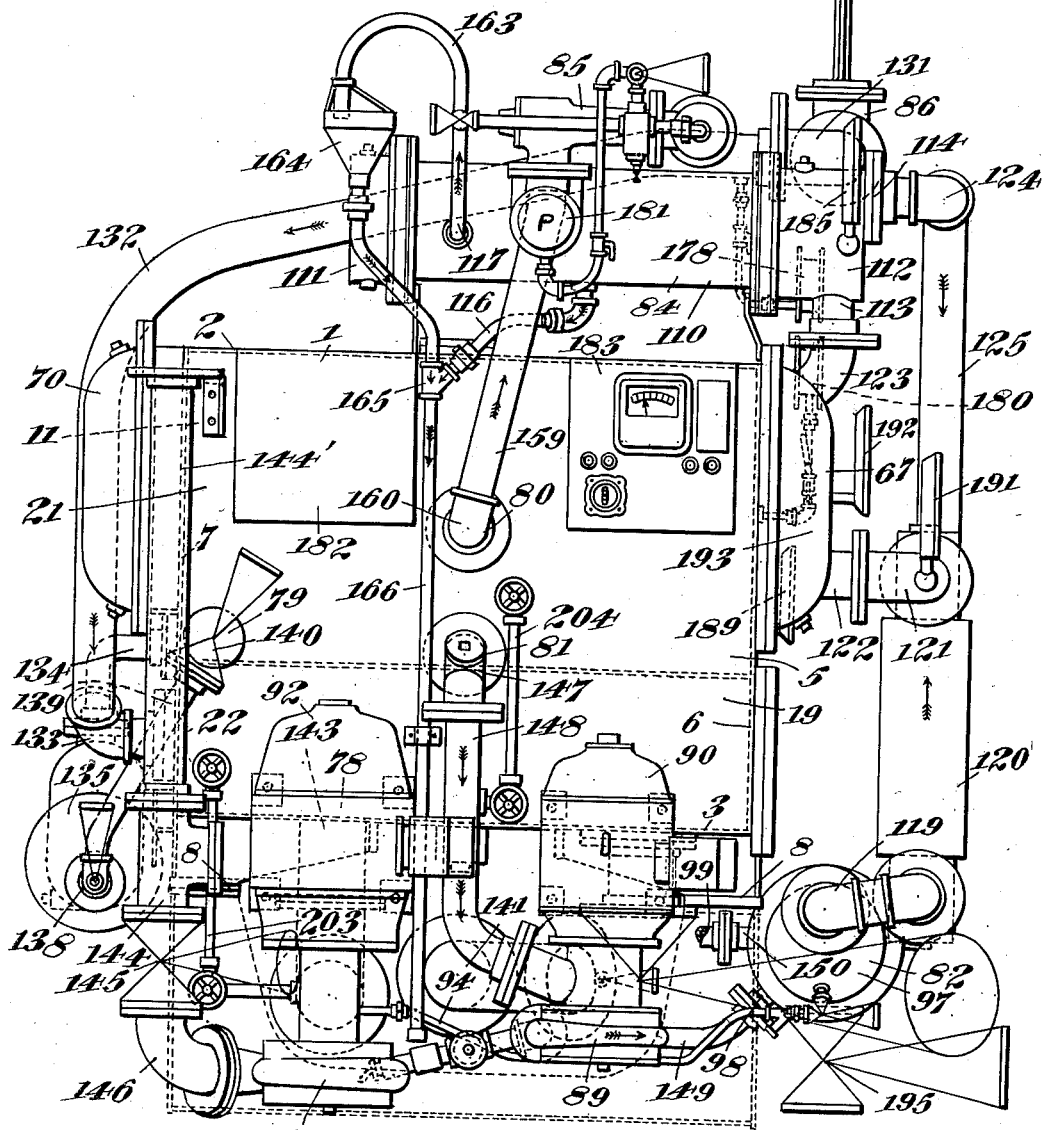
Fig. 3 is another side elevation, but showing the apparatus on the pump side.

Exteriorly of the container shell 1 are mounted various elements which we shall now briefly describe. On the bottom of said shell 1 the condensate cooler 82, and on the top of said shell the flash heater 83 and the air ejector condenser 84 are closed tubular heat exchange devices of substantially conventional design. Air ejector 85 and back pressure regulating valve 86 are also mounted on top of said shell. On the first stage side (Fig. 2) of said shell are mounted the float type drain regulator 87 and the three-way solenoid valve 88, while on the second stage side of the shell are mounted the condensate pump 89, driven by motor 90, and the brine pump 91, driven by motor 92, said pumps being provided with gland seal lines 93 and 94, and preferably being of the vertical centrifugal type as shown in Fig. 3.

The condensate cooler 82 comprises the cylindrical metal shell 95, containing tubes (not shown), which extend from the salt water inlet head 96 at one end of the condensate cooler to the salt water discharge head 97 at the other end. Condensate inlet 98 and fresh water drain 99 are provided on said shell 95.

Flash heater 83 also comprises a cylindrical metal shell 100, enclosing tubes (not shown) and provided with an end closure 101 and head 102 at the opposite end having feed inlet 103 and feed outlet 104. On the shell 100 are the steam inlet 105 having a tap hole 106 for connection to desuperheater (not shown), the bottom drain outlet 107, pressure connection 108, and vent 109.

Air ejector condenser 84, which is likewise provided with a cylindrical metal shell 110 enclosing tubes (not shown), also has an end closure 111 and a head 112 at the opposite end having feed inlet 113 and feed outlet 114. On said shell 110, air ejector connection 115, condensate drain 116 and vent 117 are also provided.

Connected to the valve-regulated salt water service line through the reducing L 118, the condensate cooler 82 is provided as above described with the inlet head 96, tubes (not shown) and discharge head 97, communicating through the L 119 to the rotameter 120. Said rotameter 120 is a well known flowmeter which accurately measures the rate of flow of the feed water and gives a continuous visual reading thereof. Said rotameter 120 communicates by means of the L 121 to the feed inlet 122 of the second stage condenser 21, the outlet 123 of which communicates directly with the feed inlet 113 of the air ejector condenser 84. Feed outlet 114 of said air ejector condenser communicates by L 124, pipe 125 and L 126 to the inlet 68 of the first stage condenser 18. Feed outlet 69 of said first stage condenser 18 communicates directly with the feed inlet 103 of the flash heater 83, and pressure connection 108 is connected by pipe 127 to the diaphragm (not shown) of the back pressure regulating valve 86. The bottom drain outlet 107 of the flash heater 83 communicates by pipe 128 to the drain regulator 87, having drain connection 129 and valve connection 130 for drains to bilge and auxiliary condenser (not shown) respectively. The feed outlet 104 of the flash heater 83 communicates through the back pressure regulating valve 86, L 131, pipe 132, L 133, and orifice 22 to the flash box 23 in the first stage chamber 16.

Figure 4:
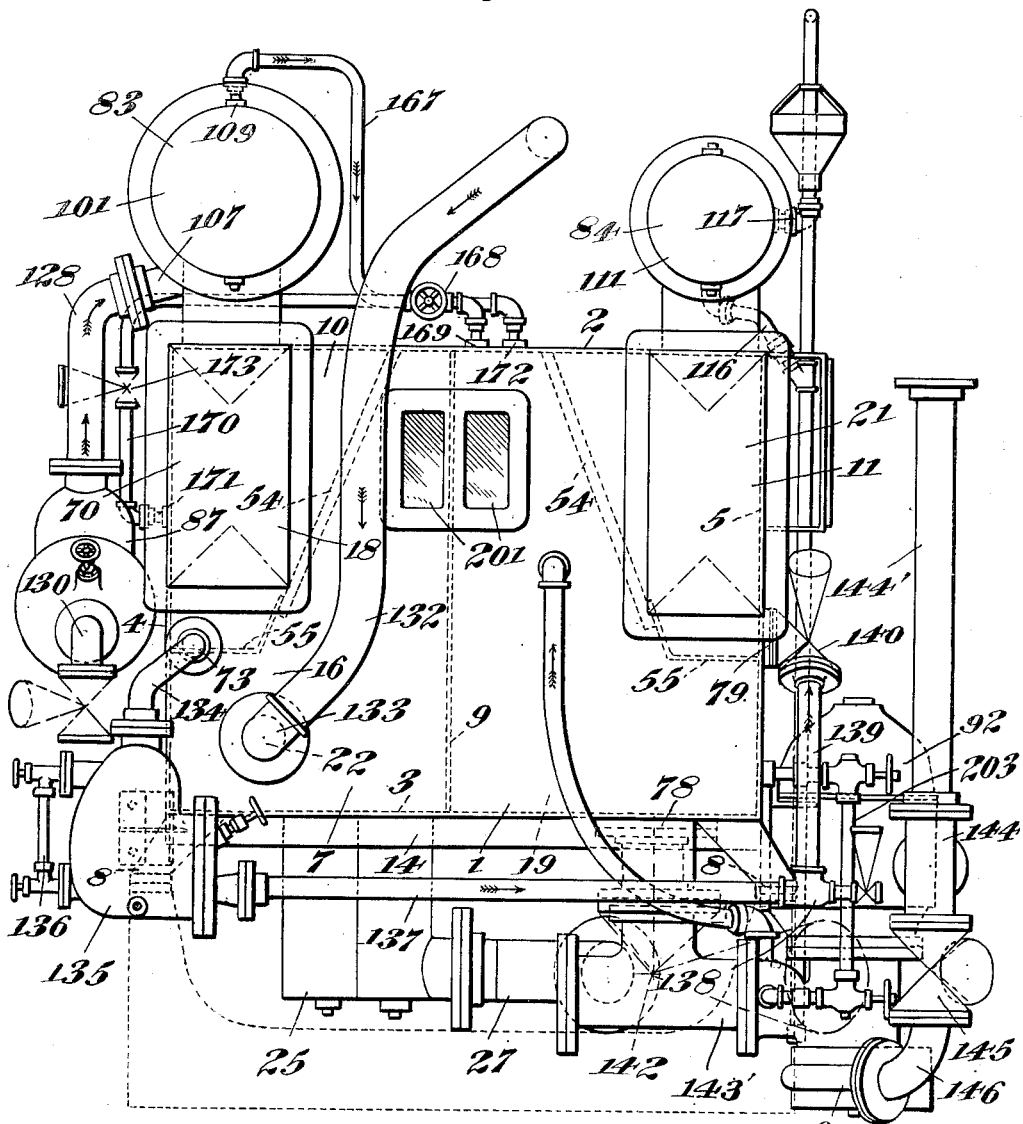
Fig. 4 is a rear elevation of the apparatus.

The rear orifice 73 of the first stage condenser 18 communicates through the bent pipe 134, drain regulator 135, gage glass 136, pipe 137, T 138, pipe 139 and valve 140 to the side inlet orifice 79 (see Figs. 3 and 4) of the second stage condenser 21.

Figure 5:
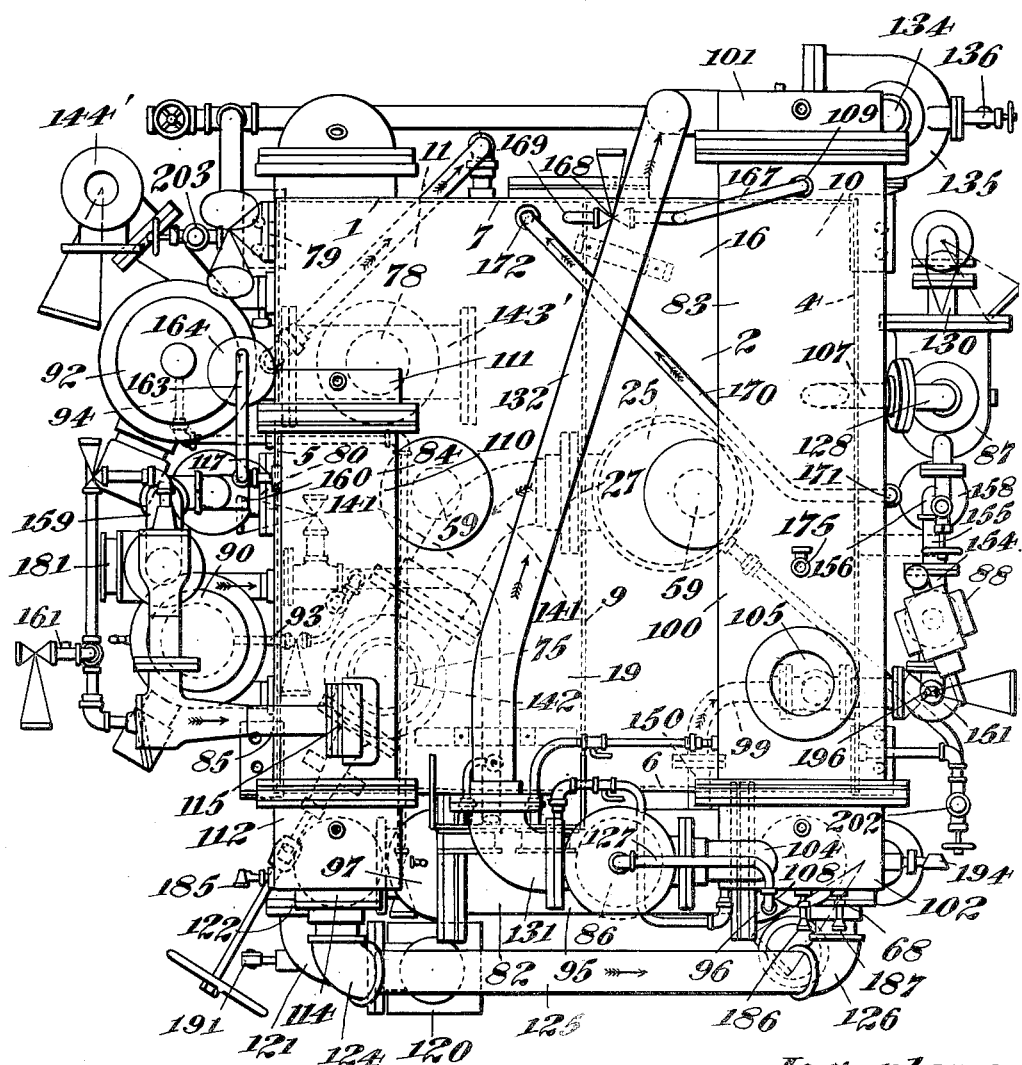
Fig. 5 is a top plan view of the apparatus.
Figure 6:
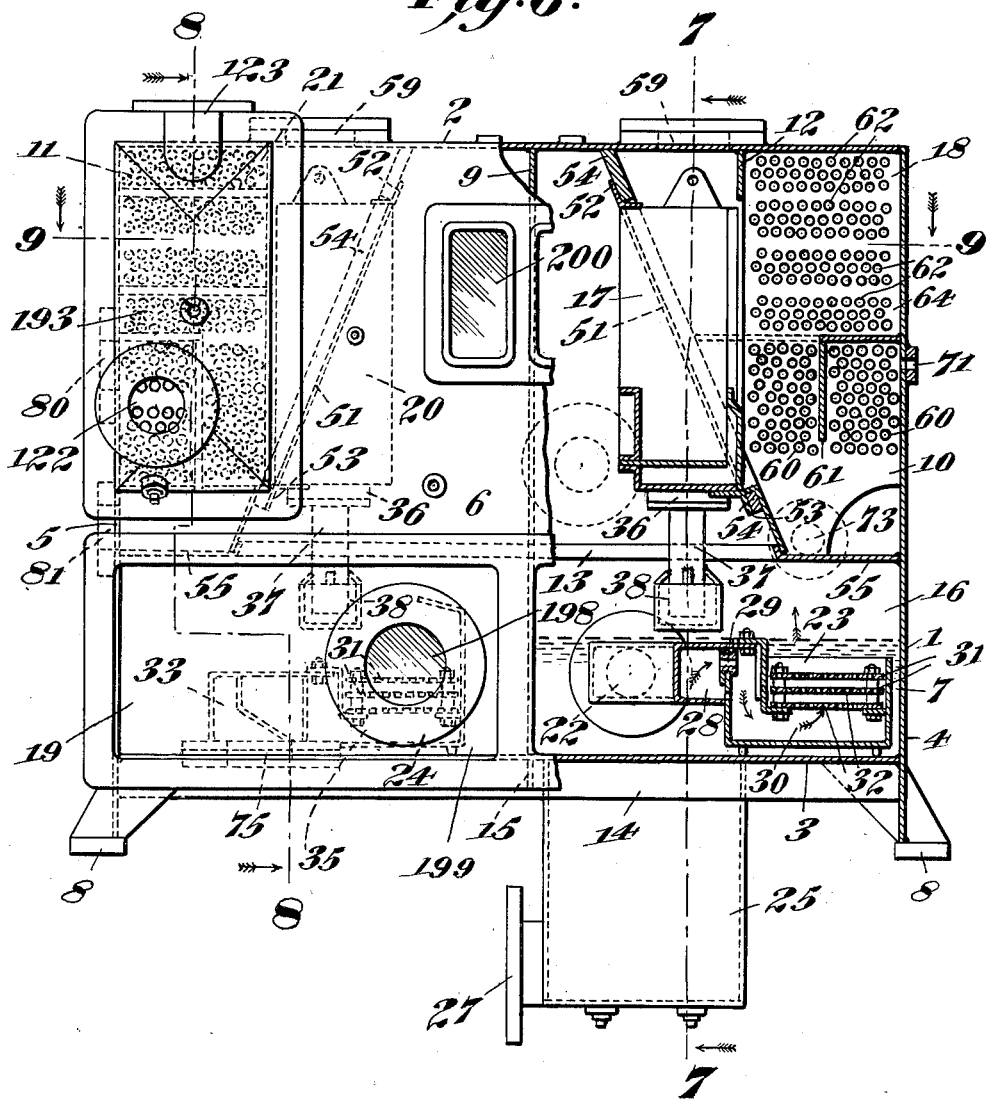
Fig. 6 is a front elevation of the evaporator shell, partially broken away to show the first stage condenser and vapor separator in section.
Figure 7:
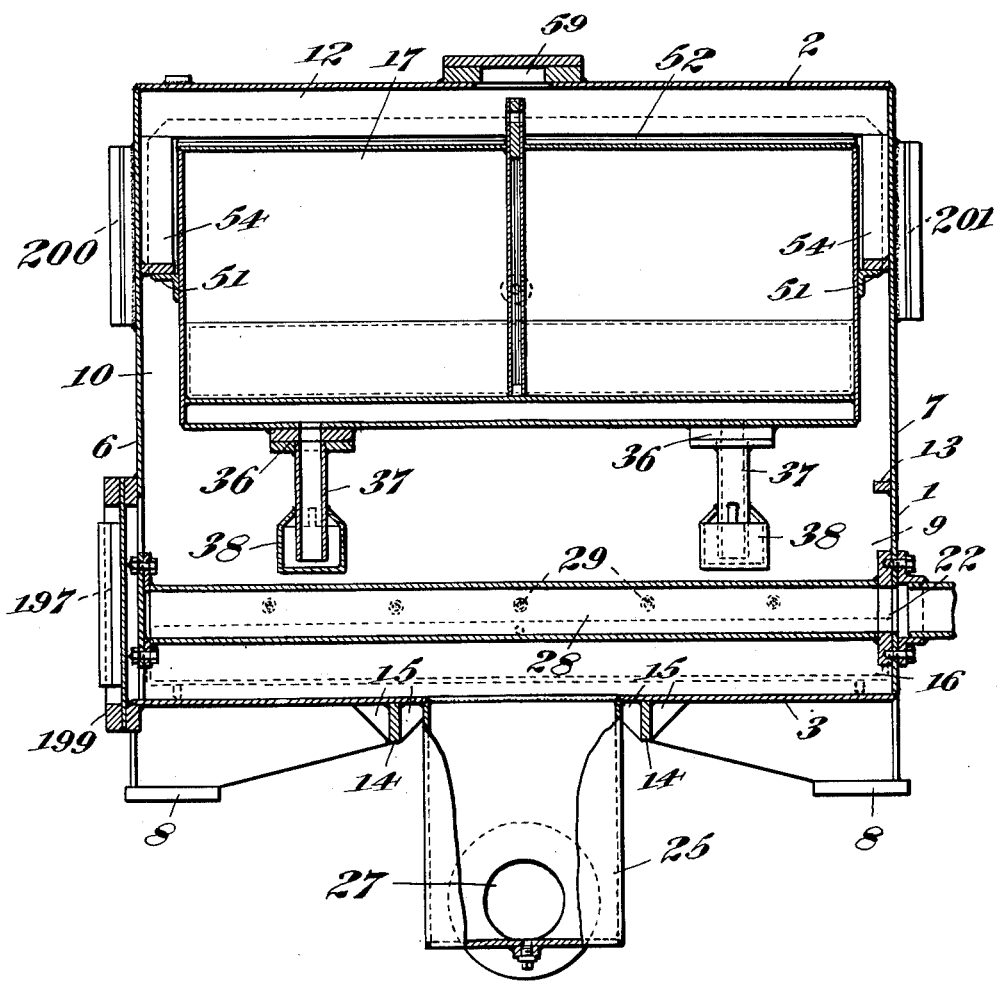
Fig. 7 is a vertical section taken on the line 7—7 of Fig. 6 through the vapor separator of the first stage, viewed in the direction of the arrows.

Drain outlet 27 of first stage well or sump 25 communicates through the bent pipe 141, angle valve 142, and bottom inlet orifice 75 (see Fig. 5) to the flash box 24 in the second stage flash chamber 19. Brine discharge orifice 78 in said second stage flash chamber 19 communicates through the drain pot 143 and T fitting 143' to the suction of brine pump 91. The discharge of brine pump 91 communicates through L 146, globe stop valve 145 and swing check valve 144 to the brine overboard discharge line 144'.

Side outlet orifice 81 of the second stage condenser 21 communicates through the sight flow L fitting 147, pipe 148, condensate pump 89 and pipe 149 to the condensate inlet 98 of the condensate cooler 82 (see Fig. 3). The fresh water drain 99 of said condensate cooler 82 communicates through the pipe 149', check valve 150, pipe 150', valve 151, pipe 152, and T 153 to the three-way solenoid valve 88, which latter valve is connected to the pipe 154 to the ship's fresh water manifold, and also by means of the pipe 155, L 156, pipe 157 and funnel 158 (see Fig. 2) to bilge.

The air ejector 85 is mounted to communicate with the interior of the second stage condenser 21 through the upright pipe 159 and L 160 connected to the orifice 80 in the side plate 5. Steam is supplied to the said ejector 85 at the connection 161 and together with ejected air from the second stage condenser 21 passes through the air ejector 85 to the connection 115 on the air ejector condenser 84. After being cooled therein the vapor leaves said air ejector condenser 84 through the vent 117, pipe 163 and funnel 164 (Fig. 3), and combined with drains from bottom connection 116 of said air ejector condenser 84 flows through Y-fitting 165 and pipe 166 to the fresh water drain collecting system.

Vent line 167 and valve 168 connect the flash heater vent 109 with second stage compartment connection 169, while vent line 170 connects the first stage compartment vent 171 with second stage compartment connection 172 through a valve 173. Valves 168 and 173 are each provided with a small orifice (about ⅛ in.) in the valve disc to allow uncondensed vapors to pass therethrough.

Relief valves 174 and 175 are provided for the condensate cooler 82 and for the flash heater 83.

Mounted on the gage board 176 on the front or operating end (Fig. 1) are a duplex vacuum-pressure gage 177 suitably connected for measuring steam pressure in the flash heater shell 100 and feed pressure before the pressure regulating valve 86; vacuum-pressure gage 178 for measuring feed pressure to the first stage flash chamber 16; and vacuum gages 179 and 180 connected to the first and second stage compartments 10 and 11. On the left or second stage side are pressure gage 181 connected to the steam line to the air ejector 85, operating instruction chart 182, and salinity indicator panel 183. A standard portable electrical salinity cell (not shown) is normally located in a fitting in the condensate cooler discharge. Fittings (without cells) are also provided for measuring the salinity of the drains from the first to the second stage condenser and of the total condensate entering the condensate cooler. Should it become necessary to obtain the salinity at one of these points the salinity cell is removed from its usual location and inserted in the appropriate fitting (see Fig. 10).

Thermometers are provided as follows: thermometer 185 on the head 112 of the air ejector condenser 84; thermometers 186 and 187 on the feed inlet head 102 and shell 100 respectively of the flash heater 83; thermometers 188 and 189 on the front 6 of the evaporator shell 1 for the first and second stage compartments 10 and 11 respectively; thermometers 190 and 191 on the feed inlet L's 126 and 121 of the first and second stage condensers 18 and 21 respectively; thermometer 194 on the L 118 having feed control valve 195 for admitting feed water to the inlet head 96 of the condensate cooler 82; and thermometer 196 on T 153 conducting condensate discharge to the solenoid valve 88.

Sight glasses for internal observation are provided as follows: lower sight glasses 197 and 198 on the front cover plate 199 for observing the first and second stage flash chambers 16 and 19; and upper front and rear sight glasses 200 and 201.

Gage glasses are provided as follows: gage glasses 202 and 203 for the first and second stage flash chambers 16 and 19; gage glass 204 for the second stage condenser 21; and gage glass 205 mounted on the drain regulator 87.

In general terms, the operation of this flash type evaporator in marine service is based upon the principle of heating sea water in tubular heat exchangers and subsequently flashing it into one or more vacuum chambers. The vapor released during flashing is condensed by the incoming salt water and becomes the fresh water product. The quantity of the fresh water produced depends upon the quantity of salt water supplied to the first stage flash chamber and the total reduction in temperature of this salt water in the flashing stages, i. e., feed temperature to first stage flash chamber minus the temperature of the last stage flash chamber.

Referring to the piping diagram, Fig. 10, in order to demonstrate the operation in detail, assuming the use of auxiliary exhaust steam at 212° F. and a sea water temperature of 85° F., and basing all quantities on one pound of fresh water produced, sea water (approximately 15.1 lbs.) supplied either by a separate circulating water pump or from the ship's salt water service mains (not shown) enters the inlet head 96 and passes through the tubes of the condensate cooler 82, where it cools the fresh water product. The salt water feed thereafter passes from the discharge head 97 upward through the L 119, rotameter 120 and inlet 122 through the tube passes of the second stage condenser 21, where it absorbs the latent heat of the condensing second stage vapor. This salt water feed then flows in turn upward through the second stage condenser outlet 123, and the inlet 113 and the tubes of the air ejector condenser 84 where it absorbs heat from the condensing air ejector vapors, downward through the L 124, pipe 125, L 126 and tubes 60 and 62 of the first stage condenser 18 where it absorbs additional heat in condensing the first stage vapors, and upward through outlet 69, and finally enters the inlet 103 and the tubes of the flash heater 83 where it is heated to approximately 197° F. by auxiliary exhaust steam condensing outside said tubes at about atmospheric pressure (212° F.). Alternatively, if bleeder steam at 162° F. is used, the exit temperature of the feed will be correspondingly lower, about 151° F.

The feed then passes through the automatic back pressure regulating valve 86, whose function is to maintain a positive feed pressure in the tubes of the flash heater 83 of not less than 5 lbs./sq. in. gage regardless of the quantity of feed flowing, in order to prevent boiling of the salt water in said flash heater tubes which would produce a deposit of salt scale. From the pressure regulating valve 86 the feed passes through L 131 downward through pipe 132, L 133 and flash box 23 into the first stage flash chamber 16 (Fig. 4), and in flashing to the pressure and temperature of that chamber (19.3 in. Hg vacuum, 164° F.) releases 0.485 lbs. of vapor. In discharging through the perforated plates 31 of the flash box 23 the vapor is subjected by the water therein to a thorough scrubbing action which removes practically all of the entrained fog. The vapor then passes through the baffles of the first stage vapor separator 17, which separates out the entrained salt moisture and returns it to the first stage flash chamber 16 through the water-sealed drain line 37. The dried vapor emerging from the first stage vapor separator 17 is condensed on the tubes 60 and 62 of the first stage condenser 18 and the condensate drains through the rear orifice 73, pipe 134, drain regulator 135, pipe 137, T 138, pipe 139 and valve 140 to the side inlet orifice 79 (Figs. 3 and 4) of the second stage condenser 21. Gage glass 136 indicates the level of condensate in the drain regulator 135.

The feed remaining after flashing overflows the top of the flash box 23, and passes through the bent pipe 141, angle valve 142, orifice 75 and flash box 24 to the second stage flash chamber 19, where it flashes down to about 25.6 in. Hg vacuum (128° F.) and in so doing 0.515 lb. of additional vapor are released. This vapor then goes through the second stage vapor separator 20 and is condensed in the second stage condenser 21 where it joins the first stage condensate to make one pound of total fresh water. This fresh water is pumped through orifice 81 (Fig. 3) sight flow L 147 and pipe 148, by means of condensate pump 89, through pipe 149 and the condensate cooler 82, pipe 149', check valve 150, pipe 150', valve 151, T 152, and pipe 153 to 3-way solenoid valve 88 (Fig. 2), which will direct the desired fresh water to the ship's tanks and water of excessive salinity (over 0.25 grain/gallon) to bilge. The 14.1 lbs. of unevaporated sea water remaining in the second stage flash chamber 19 is discharged overboard through orifice 78 (Fig. 8), drain pot 143, T 143', brine pump 91, L 146, globe stop valve 145, and swing check valve 144 to the brine overboard discharge line 144'.

This flash type evaporator is considerably simpler to operate than the conventional evaporator, since there are no boiling levels to be controlled and therefore no danger of operating with either too high or too low a water level.

Its efficiency may be judged from the fact that a unit capable of producing 10,000 gallons of fresh water daily will require approximately 0.593 lb. of exhaust steam per pound of fresh water made. It will also be seen that of 15.1 lbs. of salt water fed to the unit 14.1 pounds are pumped overboard so that the salt concentration of this overboard discharge is only 1.07 times that of normal sea water instead of the usual concentration of 1.5 customary with a standard evaporator.

Although we have described and illustrated our invention in considerable detail, we do not wish to be limited to the exact and specific details thereof as shown and described, but we may use such modifications, substitutions or equivalents thereof as are embraced within the scope of our invention or as are pointed out in the appended claims.

In accordance with statute, we therefore claim the following as our invention:

1. An apparatus for evaporating and distilling a liquid, comprising a condensate cooler wherein the feed liquid absorbs residual heat from the distilled product, a second stage condenser communicating therewith in which the feed liquid absorbs latent heat from the condensing second stage vapors, an air ejector condenser and a first stage condenser in series relation therewith in which the feed liquid absorbs additional heat from the condensing vapors, a tubular feed heater in which the feed liquid from the first stage condenser under positive pressure is heated by steam at about atmospheric pressure, a pair of flash chambers in series relation for receiving and evaporating the heated feed liquid and collecting the unevaporated residue, an air ejector adapted to maintain said flash chambers at progressively lower temperatures and pressures than in the feed heater, conduit means in each chamber having totally submerged orifices for releasing flash vapors under the surface of the collected liquid residue, superposed spaced plates provided with a plurality of vertically staggered perforations adjacent said orifices for removing fine droplets from said vapors, vapor separators communicating with the flash chambers for extracting entrained moisture from the vapors, means for passing the dried vapors through the first and second stage condensers, and a single container shell enclosing the flash chambers, vapor separators and condensers of said first and second stages.

2. An apparatus for evaporating and distilling a liquid, comprising a feed heater in which the feed liquid is heated, a pair of flash chambers in series relation for receiving and evaporating the heated feed liquid, means to maintain said flash chambers at progressively lower temperatures and pressures than in the feed heater, conduit means in each chamber having totally submerged orifices for releasing flash vapors under the surface of the feed liquid, and superposed spaced plates provided with a plurality of vertically staggered perforations adjacent said orifices for removing fine droplets from said vapors.

3. A unitary apparatus for evaporating and distilling a liquid, comprising a feed water heater; a plurality of flash chambers in series relationship from a first one to a last one thereof; feed water conduit means within each of said flash chambers having a feed water inlet connection; an upwardly facing open mouthed flash box within each of said chambers having an overflow weir; a plurality of restricted orifices connecting each said feed water conduit means with its respective flash box; means totally submerged in feed water in each flash box for scrubbing the vapor released therein; a feed water outlet connection in the bottom of each of said flash chambers; means for communicating the feed water outlet connection of each of said flash chambers except the last one thereof with the feed water inlet connection of its next succeeding flash chambers; means for communicating the feed water outlet connection of said last one of said flash chambers to a fluid withdrawal means; means for communicating the feed water inlet connection of said first one of said flash chambers with the feed water heater; vacuum generating means for maintaining successively diminishing pressures within said successive flash chambers; means associated with said flash chambers for drying and condensing the flash vapors created therein; and means for collecting the combined condensates thereof.

4. A unitary apparatus for evaporating and distilling a liquid, comprising a feed water heater; a plurality of flash chambers in series relationship from a first one to a last one thereof; feed water conduit means within each of said flash chambers having a feed water inlet connection; an open mouthed flash box within each of said chambers; a plurality of restricted orifices connecting each said feed water conduit means with its respective flash box; means totally submerged in feed water and providing tortuous passageway flow conduits for outgoing fluids mounted within each of said flash boxes, whereby vapors generated within said flash box are partially dried before rising in said flash chambers; a feed water outlet connection in the bottom of each of said flash chambers; means for communicating the feed water outlet connection of each of said flash chambers except the last one thereof with the feed water inlet connection of its next succeeding flash chamber; means for communicating the feed water outlet connection of said last one of said flash chambers to a fluid withdrawal means; means for communicating the feed water inlet connection of said first one of said flash chambers with the feed water heater; vacuum generating means for maintaining successively diminishing pressures within said successive flash chambers; means associated with said flash chambers for drying and condensing the flash vapors created therein; and means for collecting the combined condensates thereof.

5. A unitary apparatus for evaporating and distilling a liquid, comprising a feed water heater; a plurality of flash chambers in series relationship from a first one to a last one thereof; feed water conduit means within each of said flash chambers having a feed water inlet connection; an open mouthed flash box within each of said chambers; a plurality of restricted orifices connecting each said feed water conduit means with its respective flash box; means totally submerged in feed water and providing tortuous passageway flow conduits for outgoing fluids mounted within each of said flash boxes, whereby vapors generated within said flash box are partially dried before rising in said flash chambers; said last mentioned means comprising a plurality of superposed plates each provided with a plurality of perforations in vertically staggered relationship; a feed water outlet connection in the bottom of each of said flash chambers; means for communicating the feed water outlet connection of each of said flash chambers except the last one thereof with the feed water inlet connection of its next succeeding flash chamber; means for communicating the feed water outlet connection of said last one of said flash chambers to a fluid withdrawal means; means for communicating the feed water inlet connection of said first one of said flash chambers with the feed water heater; vacuum generating means for maintaining successively diminishing pressures within said successive flash chambers; means associated with said flash chambers for drying and condensing the flash vapors created therein; and means for collecting the combined condensates thereof.

6. A unitary apparatus for evaporating and distilling a liquid, comprising a feed water heater; first and second flash chambers in series relationship therewith; feed water conduit means within each of said flash chambers having a feed water inlet connection; an upwardly facing open mouthed flash box within each of said chambers having an overflow weir; a plurality of restricted orifices connecting each said feed water conduit means with its respective flash box; means totally submerged in feed water in each flash box for scrubbing the vapor released therein; a feed water outlet connection in the bottom of each of said flash chambers; means for communicating the feed water outlet connection of said first flash chamber with the feed water inlet connection of the second flash chamber; means for communicating the feed water outlet connection of said second flash chamber to a fluid withdrawal means; means for communicating the feed water inlet connection of said first flash chamber with the feed water heater; vacuum generating means for maintaining successively diminishing pressures within said first and second flash chambers; means associated with said flash chambers for drying and condensing the flash vapors created therein; and means for collecting the combined condensates thereof.

7. A unitary apparatus for evaporating and distilling a liquid, comprising a feed water heater; first and second flash chambers in series relationship therewith; feed water conduit means within each of said flash chambers having a feed water inlet connection; an open mouthed flash box within each of said chambers; a plurality of restricted orifices connecting each said feed water conduit means with its respective flash box; means totally submerged in feed water and providing tortuous passageway flow conduits for outgoing fluids mounted within each of said flash boxes, whereby vapors generated within said flash box are partially dried before rising in said flash chambers; a feed water outlet connection in the bottom of each of said flash chambers; means for communicating the feed water outlet connection of said first flash chamber with the feed water inlet connection of the second flash chamber; means for communicating the feed water outlet connection of said second flash chamber to a fluid withdrawal means; means for communicating the feed water inlet connection of said first flash chamber with the feed water heater; vacuum generating means for maintaining successively diminishing pressures within said first and second flash chambers; means associated with said flash chambers for drying and condensing the flash vapors created therein; and means for collecting the combined condensates thereof.

8. A unitary apparatus for evaporating and distilling a liquid, comprising a feed water heater; first and second flash chambers in series relationship therewith; feed water conduit means within each of said flash chambers having a feed water inlet connection; an open mouthed flash box within each of said chambers; a plurality of restricted orifices connecting each said feed water conduit means with its respective flash box; means totally submerged in feed water and providing tortuous passageway flow conduits for outgoing fluids mounted within each of said flash boxes, whereby vapors generated within said flash box are partially dried before rising in said flash chambers; said last mentioned means comprising a plurality of superposed plates each provided with a plurality of perforations in vertically staggered relationship; a feed water outlet connection in the bottom of each of said flash chambers; means for communicating the feed water outlet connection of said first flash chamber with the feed water inlet connection of the second flash chamber; means for communicating the feed water outlet connection of said second flash chamber to a fluid withdrawal means; means for communicating the feed water inlet connection of said first flash chamber with the feed water heater; vacuum generating means for maintaining successively diminishing pressures within said first and second flash chambers; means associated with said flash chambers for drying and condensing the flash vapors created therein; and means for collecting the combined condensates thereof.

9. A unitary apparatus for evaporating and distilling a liquid, comprising a feed water heater; a flash chamber; feed water conduit means within said flash chamber having a feed water inlet connection; an upwardly facing open mouthed flash box within said chamber having an overflow weir; a plurality of restricted orifices connecting said feed water conduit means with the flash box; means totally submerged in feed water in the flash box for scrubbing the vapor released therein; a feed water outlet connection in the bottom of said flash chamber; means for communicating the feed water outlet connection of said flash chamber to a fluid withdrawal means; means for communicating the feed water inlet connection of said flash chamber with the feed water heater; means associated with said flash chamber for drying and condensing the flash vapors created therein; and means for collecting the condensate thereof.

10. A unitary apparatus for evaporating and distilling a liquid, comprising a feed water heater; a flash chamber; feed water conduit means within said flash chamber having a feed water inlet connection; an open mouthed flash box within said chamber; a plurality of restricted orifices communicating said feed water conduit means with the flash box; means totally submerged in feed water and providing tortuous passageway flow conduit for outgoing fluids mounted within said flash box, whereby vapors generated within said flash box are partially dried before rising in said flash chamber; a feed water outlet connection in the bottom of said flash chamber; means for communicating the feed water outlet connection of said flash chamber to a fluid withdrawal means; means for communicating the feed water inlet connection of said flash chamber with the feed water heater; means associated with said flash chamber for drying and condensing the flash vapors created therein; and means for collecting the condensate thereof.

11. A unitary apparatus for evaporating and distilling a liquid, comprising a feed water heater, a flash chamber; feed water conduit means within said flash chamber having a feed water inlet connection; an open mouthed flash box within said chamber; a plurality of restricted orifices communicating said feed water conduit means with the flash box; means totally submerged in feed water and providing tortuous passageway flow conduits for outgoing fluids mounted within each of said flash boxes, whereby vapors generated within said flash box are partially dried before rising in said flash chamber; said last mentioned means comprising a pluralty of superposed plates each provided with a plurality of perforations in vertically staggered relationship; a feed water outlet connection in the bottom of said flash chamber; means for communicating the feed water outlet connection of said flash chamber to a fluid withdrawal means; means for communicating the feed water inlet connection of said flash chamber with the feed water heater; means associated with said flash chamber for drying and condensing the flash vapors created therein; and means for collecting the condensate thereof.

EUGENE PORTER WORTHEN.
FENNER SMITH BARBOUR.

REFERENCES CITED

The following references are of record in the file of this patent:

UNITED STATES PATENTS

| Number | Name | Date |
| --- | --- | --- |
| 643,702 | Waterhouse | Feb. 20, 1900 |
| 1,401,578 | Bleicken | Dec. 27, 1921 |
| 1,666,777 | Forbes | Apr. 17, 1928 |
| 1,982,305 | Hunicke | Nov. 27, 1934 |
| 2,027,395 | McVoy | Jan. 14, 1936 |
| 2,078,377 | Fox | Apr. 27, 1937 |
| 2,274,801 | Mills | Mar. 3, 1942 |
| 2,274,802 | Mills | Mar. 3, 1942 |
| 2,350,197 | Schneider | May 30, 1944 |
| 2,358,559 | Clemens | Sept. 19, 1944 |
| 2,398,068 | Worthen et al. | Apr. 9, 1946 |
| 2,441,361 | Kirgan | May 11, 1948 |
| 2,468,934 | Kleyn | May 3, 1949 |
| 2,485,767 | Patterson | Oct. 25, 1949 |